Inventor:
Robert B. Dome,
by Merton D. Moore
His Attorney.

Patented Jan. 30, 1951

2,539,818

UNITED STATES PATENT OFFICE 2,539,818

FREQUENCY MODULATION DETECTOR

Robert B. Dome, Geddes Township, Onondaga County, N. Y., assignor to General Electric Company, a corporation of New York Application October 28, 1948, Serial No. 57,025

8 Claims. (Cl. 250—27)

This invention relates to systems for receiving signals of the frequency or phase modulated type and particularly to demodulation circuits employed in conjunction therewith.

In a frequency modulation communication system, the signal or intelligence conveyed by the carrier is present in the form of a frequency shift of the carrier. To receive the signal or intelligence, it is necessary to provide a network which will translate the deviations in frequency of the carrier into amplitude modulations of a current proportional to the signal. Such circuits are commonly termed frequency discriminators and various types are well known in the art.

The primary requirement in a frequency discriminator is that it provide an output proportional to the frequency deviation of a carrier wave. There are a considerable number of frequency discriminator circuits known in the art at the present time which adequately meet this requirement. However, in addition to providing an output proportional to the frequency deviation of a carrier, these discriminator circuits provide an output which is also proportional to the amplitude of the carrier wave. This is an undesirable characteristic, since amplitude variations, in a frequency modulated carrier, are generally caused by undesirable interference and noise. In practice, amplitude variations are eliminated from the carrier before it is supplied to the discriminator by means of a limiter circuit. My invention provides a discriminator circuit which fundamentally responds only to deviations in frequency and which is normally unresponsive to variations in amplitude of a carrier wave. With my discriminator circuit, a limiter is rendered unnecessary and considerable economy may be effected in the construction of a frequency modulation receiver.

The principal object of my invention is to provide a detector of frequency modulated waves which fundamentally responds only to frequency deviations of a carrier wave and which is normally unresponsive to variations in the amplitude of a carrier wave.

A further object of my invention is to provide a frequency discriminator circuit capable of producing an output proportional to the deviation in frequency of a carrier wave subject to amplitude modulation, without the use of a limiting stage.

A further object of my invention is to provide a frequency discriminator, which is self-adjusting, to provided a linear output, in spite of mistuning of its circuits and drifting in frequency of a local oscillator.

For further objects and advantages and for a better understanding of the invention, attention is now directed to the following description and accompanying drawings and also to the appended claims in which the features of the invention believed to be novel are particularly pointed out.

Figure 1:
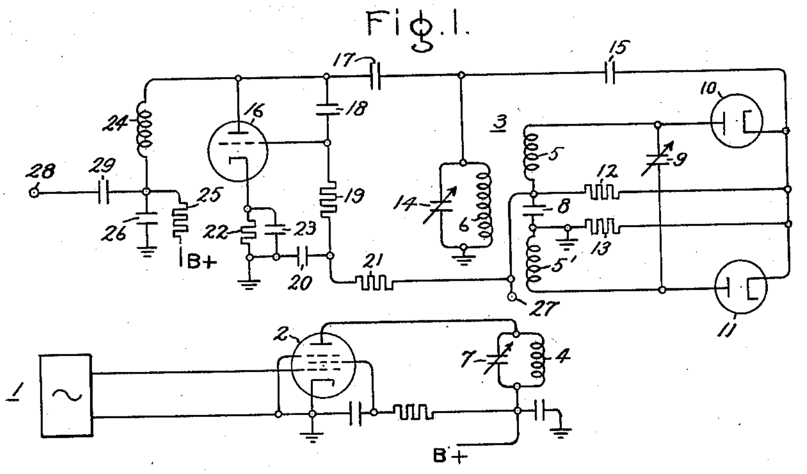
Figure 2:
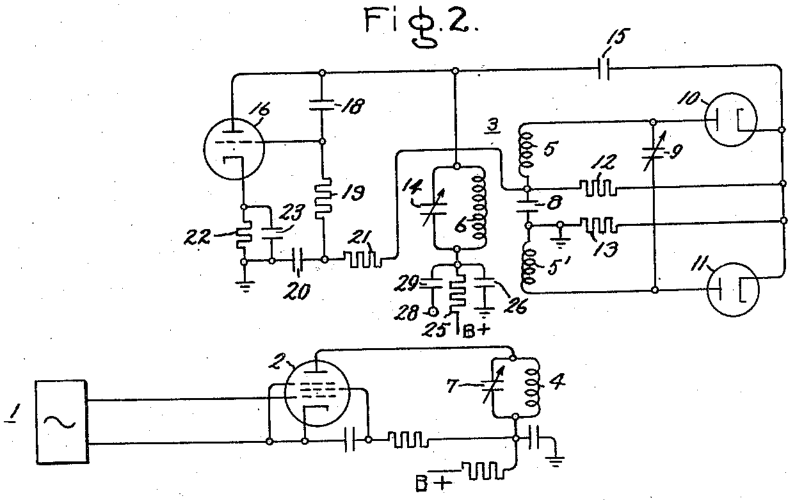
Figure 3:
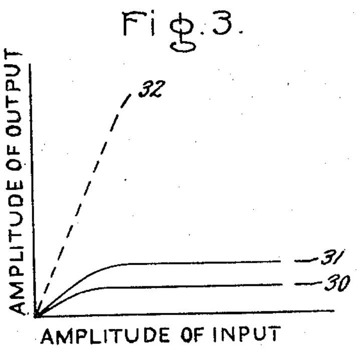

In the drawings: Fig. 1 is a schematic diagram of a frequency discriminator embodying my invention; Fig. 2 is a schematic diagram of a frequency discriminator embodying my invention with certain modifications over that of Fig. 1; and Fig. 3 shows a series of curves illustrating certain operating characteristics of the discriminators of Figs. 1 and 2.

Referring to Fig. 1, there is shown a source 1 of frequency modulated waves and an amplifying discharge device 2 for these waves. Discharge device 2 may, for instance, be the final intermediate frequency amplifying discharge device of a receiver. A discriminator transformer 3 has a primary winding 4, a secondary winding consisting of a pair of split halves 5 and 5′ and a tertiary winding 6, all of which are inductively coupled together. The primary winding 4 is connected to the output of discharge device 2 and is tuned by a variable capacitance 7 to provide the proper load impedance to the anode of device 2 at the operating frequency. Operating potential is provided to the discharge device from a source, not shown in the drawing, indicated by B+. The secondary windings 5 and 5′ are connected together by a capacitance 8, of which one side is grounded, and are tuned by a variable capacitance 9. A pair of diodes 10 and 11 are connected in conventional manner across the output terminals of the secondary windings as balanced detectors, having load resistors 12 and 13 respectively. The tertiary winding 6 is tuned, either by stray circuit capacity, or by some means such as a variable capacitance 14 connected in parallel therewith. One terminal of inductance 6 is grounded, and the other terminal is coupled, by means of a capacitance 15, to the junction of the cathodes of the diodes 10 and 11 with the load resistors 12 and 13.

A discharge device 16 is connected in parallel with the tertiary winding 6 as a reactance modulator, through a capacitance 17. The anode of discharge device 16 is coupled to its grid through a capacitance 18, and the grid is coupled to the cathode through a resistance 19 and a by-pass capacitance 20. Capacitance 18 is selected to have, over the range of operating frequencies, a reactive impedance considerably larger than the resistive impedance of resistance 19. This provides a voltage at the control grid of discharge device 16 which leads the anode voltage by almost 90°. Discharge device 16 thereby acts as an equivalent electronic reactance in a manner well known to the art. The magnitude of the equivalent reactance offered by discharge device 16 is controlled by a voltage obtained at the discriminator output across capacitance 8. This voltage is coupled to the control grid of discharge device 16 through a filtering resistance 21. Capacitance 20 is selected to have a comparatively low reactive impedance in comparison with the resistive impedances of resistances 19 and 21 throughout the frequency range of the carrier wave, but has a sufficiently high reactance at the frequency of the modulating signal so as not to appreciably affect its magnitude. Discharge device 16 is suitably biased by a resistance 22 connected between its cathode and ground in parallel with a by-pass capacitance 23. Discharge device 16 obtains its operating potential from a source, not shown in the drawing, indicated by B+, connected to the anode through a radio frequency choke inductance 24 and a resistance 25. Resistance 25 is suitably bypassed for frequencies throughout the frequency range of the carrier wave by means of a capacitance 26 connected from the junction of inductance 24 and resistance 25 to ground.

A signal output consisting of a voltage, whose amplitude is proportional to the frequency swing of the carrier wave, may be obtained at either one of terminals 27 or 28. Terminal 27 is connected to the side of capacitance 8 which is not grounded and the signal output is available between this terminal and ground. Terminal 28 is connected to the junction of inductance 24 and resistance 25 by a capacitance 29. The signal output available at this terminal is amplified over that available at terminal 27. The amplification takes place through the operation of discharge device 16 as an audio amplifier for the modulating signal voltage applied to its control grid. The purpose of coupling capacitance 29 is simply to isolate the audio circuit, utilizing the output at terminal 28, from the operating potential at the anode of discharge device 16.

In operation, leaving out of account the effect of the reactance modulator circuit comprising discharge device 16, the circuit operates similarly to an ordinary frequency discriminator. All three windings of the transformer are tuned to the center carrier frequency. The windings 5 and 5' impress voltages of equal magnitude and of opposite phase across the detector circuit comprising diodes 10 and 11 and load resistors 12 and 13. The tertiary winding 6, which is tuned to resonance at the center carrier frequency, couples a voltage through capacitance 15 into the secondary circuit. When the carrier wave is unmodulated, this voltage is in quadrature relationship with the voltages developed by the secondary windings. Accordingly two equal resultant voltages are produced, and since the output of the balanced detectors is proportional to the difference in magnitude of the resultants, the output is zero. When the carrier is shifted in frequency, the relative phase of the voltage developed across the tertiary winding, and coupled into the secondary winding by means of capacitance 15, changes with respect to that of the voltages developed in the secondary windings. The diodes and load resistors are so arranged that the net output voltage across capacitance 8 is the difference in output of the two diodes. Since the voltages combine in definite phase when the frequency of the carrier is shifted, an output voltage is developed across capacitance 8 which is proportional to the frequency shift of the carrier.

The circuit, as thus far described, provides an output voltage which is proportional to the frequency deviation of a carrier wave from the center frequency. It is also apparent that the amplitude of the output voltage, in addition to being proportional to the frequency shift of the carrier wave, is also proportional to the magnitude of the carrier. Stated in another way, the greater the frequency shift of the carrier wave, the greater the output voltage; and the greater the magnitude of the carrier, the greater the output volume.

My invention resides particularly in the circuit as modified by the reactance modulator whose operation will now be explained:

When all three windings of the discriminator transformer 3 are tuned to the center frequency of the carrier wave and the carrier wave is unmodulated, the voltage developed across capacitance 8 is zero and the control voltage coupled to the grid of discharge device 16 through resistance 21 is also zero. Under the condition of zero-control voltage at the control grid, discharge device 16 functions as an equivalent reactance of a certain magnitude in a manner well known to the art, since its control grid is excited with a voltage in essentially quadrature relationship with its anode voltage by virtue of the combination of capacitance 18 and resistance 19, and the voltage coupled from the tertiary winding 6 to capacitance 17. This equivalent reactance is in parallel with tertiary winding 6 and accordingly has a certain detuning effect on the parallel network of inductance 6 and capacitance 14.

Assume now that capacitance 14 is readjusted so that tertiary winding 6, in parallel with the equivalent reactance of discharge device 16, is tuned to resonance at the center carrier frequency with zero control voltage at the grid of discharge device 16. Under such conditions when the frequency of the carrier is shifted in either direction from the center frequency, a signal voltage is developed between terminal 27 and ground and is applied to the control grid of discharge device 16. Secondary windings 5 and 5' are poled so that the signal voltage applied to the control grid of discharge device 16 is of such a polarity as to cause the equivalent reactance of the discharge device to shift in a direction to reduce the voltage developed across the detecting circuit. Of course, the equivalent reactance offered by discharge device 16 is never sufficient to reduce the signal voltage entirely to zero because then there would be no signal voltage available at the control grid of discharge device 16 to cause its equivalent variation in inductance. The signal voltage developed across capacitance 8 is thus proportional to the frequency deviation of the carrier from its center frequency. For example; if a reactance change equivalent to two units of capacity is required, the signal voltage applied to the control grid of discharge device 16 may be one volt to supply this reactance change. If the frequency deviation is doubled, four units of capacity may be needed, so the signal voltage will change to two volts to provide the necessary balance. Since capacitance 14 is initially adjusted so that tertiary winding 6, in combination with the reactance of discharge device 16 at zero signal input, are at the midpoint of the frequency deviation-amplitude characteristic of the discriminator, the frequency change may be either positive or negative and automatic following will take place.

The magnitude of the signal voltage required to produce an equivalent change in reactance is independent of the amplitude of the carrier wave. For instance, in the case where two units of capacity are required and a signal of one volt is required to supply this reactance, the signal does not change appreciably from the magnitude of one volt no matter what input level of carrier wave is provided by source 1. This is due to the fact that the reactive currents provided by discharge device 16 are controlled by the magnitude of the voltage coupled to its anode from the tertiary winding 6. The larger the voltage coupled to its anode, the larger is the reactive current supplied by the discharge device. In other words, the discharge device functions as a reactance whose magnitude is determined by the signal control voltage and not by the voltage at the frequency of the carrier applied to its anode.

In effect then, the signal output across capacitance 8 and available at terminal 27 has an amplitude fundamentally proportional to the deviation in frequency of the carrier and this voltage is essentially independent of the amplitude of the carrier wave. If the amplitude of the carrier wave falls below the value required to operate discharge device 16 as a reactance modulator, the signal output decreases in magnitude. This effect is, however, of very slight importance because, in practice, the amplifying stages of the receiver preceding the discriminator circuit can be adjusted to give a carrier wave having an amplitude which does not fall below this predetermined value.

The operating characteristics of my discriminator are illustrated in Fig. 3. Curve 30 illustrates the output at terminal 27 as a function of the input level supplied by source 1 for a frequency shift of 40 kilocycles. Curve 31 similarly illustrates the output obtained with a frequency shift of 75 kilocycles. The curves both originate from the same point and, after passing through an initial stage of increase at very low signal levels, become essentially flat, indicating that the output is essentially independent of the amplitude of the input. The broken curve 32 illustrates the output of a typical frequency discriminator circuit without the reactance modulator employed in the circuit of my invention.

Since the reactance modulator discharge device 16 shifts the resonant frequency of the tertiary winding in a direction to reduce the output of the discriminator, it follows that it also tends to compensate for a certain amount of detuning in the discriminator or of frequency drift in a local oscillator contained in the source 1. Of course, too much detuning cannot be allowed to occur because then the selectivity of the intermediate frequency amplifiers in the source 1 would discriminate against certain frequencies and introduce distortion into the output.

An amplified output, similar to that available at terminal 27 may also be obtained at terminal 28. The output available at terminal 28 is actually the signal voltage amplified by discharge device 16 whose anode current is controlled thereby. Discharge device 16, in addition to functioning as an equivalent reactance at the frequency of the carrier wave, functions also as an audio amplifier for the control signal applied to its control grid. In practice, a reasonable measure of amplification of the signal voltage, may be obtained through discharge device 16, without undue sacrifice of its control action as a reactance modulator.

Referring to Fig. 2, there is shown another embodiment of my invention in which a different method of providing an operating voltage to discharge device 16 has been utilized. The anode of discharge device 16 is connected directly to one terminal of the tertiary winding 6, and an operating potential from a source, indicated by the legend B+, is applied to the other terminal of winding 6 in series with resistance 25, which is by-passed for the carried wave frequencies by capacitance 26 connected to ground. The signal output is available at terminal 28 connected to the junction of winding 6 and resistance 25 by capacitance 29. This circuit operates in the same manner as that of Fig. 1 and permits the elimination of the choke or inductance 24 and of capacitance 17 which were required therein. In all other respects, the circuit operates in a manner identical to that of Fig. 1.

While certain specific embodiments have been shown and described, it will, of course, be understood that various modifications may be made without departing from the invention. The appended claims are, therefore, intended to cover all such modifications within the true spirit and scope of the invention.

What I claim as new and desire to secure by Letters Patent of the United States is:

1. A frequency discriminator circuit comprising a transformer having three windings inductively coupled together, the first of said windings being adapted to be energized by a carrier wave, the second of said windings comprising a pair of inductances having first terminals connected together by an output impedance and having tuning means, a pair of balanced detectors connected across the other terminals of said inductances, means for tuning the third of said windings to the frequency of said carrier wave, a connection between one side of said third winding and said balanced detectors, and a reactance modulator connected in parallel with said third winding, said modulator having an input connected across said output impedance to shift the resonant frequency of said third winding toward the instantaneous frequency of said carrier wave whereby an output voltage proportional to a frequency deviation of said carrier wave and substantially independent of the amplitude of said carrier wave is produced across said output impedance.

2. A frequency discriminator circuit comprising a transformer having three windings inductively coupled together, the first of said windings being adapted to be energized by a carrier wave, the second of said windings comprising equal halves connected together at one end by an output capacitance, a tuning capacitance and a pair of balanced detectors connected across the other ends of said halves, the third of said windings having a variable capacitance in parallel therewith for tuning to the frequency of said carrier, a capacitive connection between one side of said third winding and said balanced detectors, and a reactance modulator connected in parallel with said third winding, said modulator having input terminals connected across said output capacitance to shift the resonant frequency of said third winding toward the instantaneous frequency of said carrier wave whereby an output voltage proportional to a frequency deviation of said carrier wave and substantially independent of the amplitude of said carrier wave is produced across said output capacitance.

3. A frequency discriminator circuit comprising a transformer having three windings inductively coupled together, the first of said windings being adapted to be energized by a carrier wave subject to an instantaneous frequency deviation about a center frequency in response to a modulating signal, the second of said windings comprising equal halves having one of their terminals connected together by an output capacitance, a tuning capacitance and a pair of balanced detectors connected across the remaining terminals of said halves, the third of said windings having means associated therewith for tuning to resonance at said center frequency, a capacitive connection between one terminal of said third winding and said balanced detectors, and a reactance discharge device connected in parallel with said third winding, said discharge device having an input circuit connected across said output capacitance to shift the resonant frequency of said third winding toward the instantaneous frequency of said carrier, whereby the output voltage across said capacitance is proportional to the frequency deviation of said carrier wave caused by a modulating signal and is substantially independent of the amplitude of said carrier wave.

4. A frequency discriminator circuit comprising a transformer having three windings inductively coupled together, the first of said windings being adapted to be energized by a carrier wave subject to an instantaneous frequency deviation about a center frequency in response to a modulating signal, the second of said windings comprising a pair of equal coils each having first and second terminals, an output capacitance connecting said first terminals, one of said first terminals being grounded, means for tuning said second winding to said center frequency, a pair of equal resistances in series connected in parallel with said output capacitance, a pair of rectifiers connecting said second terminals to the junction of said resistances, the third of said windings having means for tuning to resonance at said center frequency, one side of said third winding being grounded and the other side being capacitively connected to said junction, and a reactance discharge device connected in parallel with said third winding, said discharge device having an input circuit connected across said output capacitance to shift the resonant frequency of said third winding toward the instantaneous frequency of said carrier, whereby the voltage across said capacitance varies with the frequency of said signal and is substantially independent of the amplitude of said carrier wave.

5. A frequency discriminator circuit comprising a transformer having three windings inductively coupled together, the first of said windings being adapted to be energized by a carrier wave subject to an instantaneous frequency deviation about a center frequency in response to a modulating signal, the second of said windings comprising a pair of equal coils each having first and second terminals, an output capacitance connecting said first terminals, one of said first terminals being grounded, means for tuning said second winding to said center frequency, a pair of serially connected equal resistances connected in parallel with said output capacitance, a pair of rectifiers connecting said second terminals to the junction of said resistances, the third of said windings being tuned to said center frequency, one side of said third winding being grounded and the other side being capacitively connected to the said junction, and a reactance discharge device connected in parallel with said third winding, said discharge device having an input circuit connected across said output capacitance to shift the resonant frequency of said third winding toward the instantaneous frequency of said carrier, and said discharge device being supplied with operating potential from a source of constant voltage in series with an output resistance, whereby an output voltage, proportional to the frequency deviation, and substantially independent of the amplitude of said carrier wave, is produced across said output resistance.

6. A frequency discriminator circuit comprising a transformer having three windings inductively coupled together, the first of said windings being adapted to be energized by a carrier wave, means for tuning the second of said windings to the frequency of said carrier wave, a balanced detector circuit connected across said second winding, said detector current including a pair of rectifying devices and an output circuit, means for coupling the third of said windings to an intermediate point on said output circuit, and means for tuning said third winding to the frequency of said carrier wave, said last named means including a reactance modulator connected across said third winding, said modulator having an input connected across said output circuit to shift the resonant frequency of said third winding toward the instantaneous frequency of said carrier wave whereby an output voltage proportional to a frequency deviation of said carrier wave and substantially independent of the amplitude of said carrier wave is produced across said output circuit.

7. A frequency discriminator circuit comprising a transformer having first and second windings coupled together, means for coupling a carrier wave to said first winding, means for tuning said first winding to the frequency of said carrier wave, a balanced detector circuit connected across said first winding, said detector circuit comprising a pair of rectifying devices and an output circuit, a connection between said second winding and an intermediate point in said output circuit, and means for tuning said second winding to the frequency of said carrier wave, said last named means including a reactance discharge device connected across said second winding, said reactance device having an input connected across said output circuit to shift the resonant frequency of said second winding toward the instantaneous frequency of said carrier wave whereby an output voltage proportional to a frequency deviation of said carrier wave and substantially independent of the amplitude of said carrier wave is produced across said output circuit.

8. A frequency discriminator circuit comprising a transformer having first and second windings coupled together, means for coupling a carrier wave to said first winding, means for tuning said first winding to the frequency of said carrier wave, a balanced detector circuit connected across said first winding, said detector circuit comprising a pair of rectifying devices and an output circuit, means for coupling said second winding to an intermediate point on said output circuit, and means for tuning said second winding to the frequency of said carrier wave, said last named means including a reactance discharge device connected across said second winding, said reactance device having an input connected across said output circuit to shift the resonant frequency of said second winding toward the instantaneous frequency of said carrier wave whereby an output voltage proportional to a frequency deviation of said carrier wave and substantially independent of the amplitude of said carrier wave is produced across said output circuit.

ROBERT B. DOME.

REFERENCES CITED

The following references are of record in the file of this patent:

UNITED STATES PATENTS

| Number | Name | Date |
|---|---|---|
| 2,356,201 | Beers | Aug. 22, 1944 |
| 2,412,482 | Vilkomerson | Dec. 10, 1946 |